United States Patent [19]

Partridge et al.

[11] 4,206,193

[45] Jun. 3, 1980

[54] VERSATILE PROCESS FOR GENERATING CHLORINE DIOXIDE

[75] Inventors: Harold deV. Partridge, Wilson; Peter Lai, Grand Island, both of N.Y.

[73] Assignee: Hooker Chemicals & Plastics Corp., Niagara Falls, N.Y.

[21] Appl. No.: 970,823

[22] Filed: Dec. 18, 1978

[51] Int. Cl.$^2$ ............................................. C01B 11/02
[52] U.S. Cl. ..................................... 423/478; 423/499
[58] Field of Search ............... 423/477, 478, 479, 480, 423/499

[56] References Cited

U.S. PATENT DOCUMENTS

| | | | |
|---|---|---|---|
| 2,936,219 | 5/1960 | Rapson | 423/478 |
| 3,446,584 | 5/1969 | Fuller | 423/480 |
| 3,733,395 | 5/1973 | Fuller | 423/478 |
| 3,754,081 | 8/1973 | Partridge | 423/478 |
| 3,933,987 | 1/1976 | Schulz | 423/478 |
| 4,045,542 | 8/1977 | Fuller | 423/478 |
| 4,049,784 | 9/1977 | Fuller | 423/478 |
| 4,086,328 | 4/1978 | Swindells | 423/478 |

FOREIGN PATENT DOCUMENTS 2293521  6/1976  France ..................................... 423/478

Primary Examiner—Brian E. Hearn
Attorney, Agent, or Firm—Peter F. Casella; William G. Gosz

[57] ABSTRACT

An improved process is provided for the production of chlorine dioxide and chlorine wherein a chlorine dioxide generator may be operated interchangeably in either sulfuric acid or hydrochloric acid mode without changing acidity levels or evacuating the liquor of one mode and refilling with liquor of the second mode before continuing generation. The versatile process for production of chlorine dioxide comprises maintaining saturated solutions of both alkali metal chloride and alkali metal sulfate in the generator at an acid normality of from about 2 to about 11 in the presence of a small amount of catalyst selected from the group consisting of vanadium pentoxide, silver ions, manganese ions, dichromate ions and arsenic ions. Thus, the instant process provides high yields of chlorine dioxide even at high acidities making it possible to manufacture balanced quantities of saltcake and alkali metal chloride by-products as may be required.

10 Claims, No Drawings

VERSATILE PROCESS FOR GENERATING CHLORINE DIOXIDE

BACKGROUND OF THE INVENTION

The present invention relates to a new, economical, very efficient process for generating chlorine dioxide.

Inasmuch as chloride dioxide is of considerable commercial importance in the field of pulp bleaching, water purification, fat bleaching, removal of phenols from industrial wastes, textile bleaching, and the like, it is very desirable to have a process by which it can be economically generated.

One means for the generation of chlorine dioxide is by way of reaction of a chlorate, a chloride, and sulfuric acid providing an acid normality of about 2 to 12. The reactions which occur are exemplified below, whereby, for the sake of illustration, the chlorate used is sodium chlorate and the chloride used is sodium chloride.

(1)
$$NaClO_3 + NaCl + H_2SO_4 \rightarrow ClO_2 + \tfrac{1}{2}Cl_2 + Na_2SO_4 + H_2O$$

(2)
$$NaClO_3 + 5NaCl + 3H_2SO_4 \rightarrow 3Cl_2 + 3Na_2SO_4 + 3H_2O$$

This technique for chlorine dioxide production is used on a commercial scale, with the reactants continuously being fed into a reaction vessel and the chlorine and chlorine dioxide produced continuously being removed from the reaction vessel with large quantities of sodium sulfate (saltcake) by-product also being generated for use in kraft paper mill processes.

Another means for the generation of chlorine dioxide is by the reaction of a chlorate with hydrochloric acid at an acid normality of about 0.05 to about 1. The reactions which occur are exemplified below, wherein, for the sake of illustration the chlorate used is sodium chlorate.

(1a) $2NaClO_3 + 4HCl \rightarrow 2ClO_2 + Cl_2 + 2NaCl + 2H_2O$ (2a) $NaClO_3 + 6HCl \rightarrow 3Cl_2 + NaCl + 3H_2O$.

The combined use of the reagents sodium chloride and sulfuric acid to convert sodium chlorate to chlorine dioxide has generally been equated in the prior art with the use of hydrochloric acid to convert sodium chlorate to chlorine dioxide (Sepall et al. U.S. Pat. No. 3,347,628, column 2, lines 39–52 and column 3, lines 1–2). In theory, sodium chloride and sulfuric acid react to produce hydrochloric acid in situ in accordance with the following equation:

(3) $2NaCl + H_2SO_4 \rightarrow 2HCl + Na_2SO_4$

In actuality, however, an equilibrium exists between $Na_2SO_4$ and sulfuric acid to produce $NaHSO_4$ per the following reaction sequence (4) $SO_4^= + 2H^+ \rightleftharpoons 2HSO_4^-$ (5) $NaCl + H_2SO_4 \rightarrow HCl + NaHSO_4$ Thus, though the acidity range generally considered applicable in chlorine dioxide generation is about 2 to 12 normal in sulfuric acid, when sulfuric acid is employed as the strong acid, at temperatures above about 30 degrees centigrade, one will recover the neutral sodium sulfate ($Na_2SO_4$) if the acidity of the reaction solution is maintained between about 2–4.8 normal (Winfield et al., U.S. Pat. No. 3,864,456). The production of sodium sulfate and sodium bisulfate occurs at higher acid concentrations.

The acidity range generally considered most desirable in chlorine dioxide generation in a hydrochloric acid system (mode) is about 0.05 to about 1.0 without a catalyst. Beyond about 1.0 normality the chlorine production increases at the expense of chlorine dioxide production so as to render the process inefficient (Canadian Patent 956,784 to Winfield). The use of catalysts, however, extends the cavity range which might be efficiently utilized up to about 1.9 normal (British Pat. No. 1,347,740 to Partridge et al).

Thus, heretofore to operate either a sulfuric acid-sodium sulfate system or a hydrochloric acid-sodium chloride system in a single vessel chlorine dioxide reactor-crystallizer-evaporator it was necessary to operate at two widely different acidity levels. In changing from one acid system to the other using the same reactor-crystallizer it was necessary to evacuate the first generator liquor to a holding tank and then refill the generator with the second liquor before continuing generation of chlorine dioxide.

It has now been discovered that if chlorine dioxide generator liquor is saturated with solutions of both alkali metal sulfate and alkali metal chloride it is permissable to operate under the same reaction conditions regardless of whether sulfuric acid or hydrochloric acid etc., is being used in the same generator. Thus, depending on what the particular salt by-product needs of a paper mill are at a given time, and the ready availability of acid, sulfuric or hydrochloric, it is now possible to operate under the same conditions at the same acid normality (about 2 to about 11) by simply introducing one acid or the other to the generator. This more flexible process eliminates required evacuation of the generator in switching from one system or mode to the other, and furthermore, offers a more satisfactory means of achieving balanced inventories of both sodium sulfate saltcake and sodium chloride by-products required in pulp bleaching processes and in producing sodium chlorate.

Accordingly, it is the principal object of the present invention to provide a more flexible process for production of chlorine dioxide and chlorine wherein various mineral acids may be used interchangeably in the same reactor without modification of operating conditions or changing generating liquors.

It is a further object of the present invention to provide a versatile process for generating chlorine dioxide and chlorine which enables greater control over salt by-product inventories.

A still further object of the instant invention is to provide a versatile high acidity hydrochloric acid system which will also permit highly efficient production of both chlorine dioxide and chlorine in a single vessel type generator-crystallizer-evaporator.

These and other objects, features and advantages will become more apparent from a reading of the following summary and more detailed description of the invention.

SUMMARY OF THE INVENTION

In accordance with this invention there is provided a process for the production of chlorine dioxide and chlorine which comprises reacting an alkali metal chlorate with a strong acid interchangeably selected from the group consisting of sulfuric acid, hydrochloric acid, and mixtures thereof, in an aqueous reaction solution containing:

(a) optionally, at least one catalyst selected from the group consisting of vanadium pentoxide, silver ions, manganese ions, dichromate ions and arsenic ions;
(b) from 0.5 to about 5 molar alkali metal chlorate;
(c) from about 2.0 to about 11.0 normal strong acid at a temperature from about 25 to 90 degrees centigrade and a pressure of about 20 to about 400 millimeters mercury absolute; and
(d) saturated solutions of both alkali metal chloride and alkali metal sulfate;

coordinating the temperature and pressure to effect the withdrawal of water vapor from said reaction solution in admixture with said chlorine dioxide and chlorine to maintain a substantially constant volume, and allowing the substitution of said strong acid to produce the desired alkali salt of the acid.

The process of this invention provides for the production of chlorine dioxide, chlorine, and an alkali metal chloride or sulfate saltcake, and results in the substantial absence of acid effluent from the vessel. The process also allows maximum flexibility in the control of the alkali metal salt produced therefrom. By simply changing the acid feed, without adjusting acidity, the salt produced can be either the sulfate or the chloride as may be needed to provide reactants for other portions of the bleaching process.

DESCRIPTION OF THE PREFERRED EMBODIMENTS

The acid concentration of the generating liquor of this invention may vary from about 2 to about 11 normal, and more specifically from about 2 to about 5 normal. Higher acid concentrations generally result in lower sodium chlorate concentrations in the generator liquor and increased solubility of sodium sulfate (if sulfuric acid is employed) and sodium chloride (if hydrochloric acid is employed).

Unexpectedly, within the normality range of about 2 to about 11, the presence of the saturated alkali metal chloride solution does not adversely effect the chlorine dioxide generating efficiency. The presence of the saturated alkali metal sulfate solution increases the efficiency.

When hydrochloric is the strong acid, the saturated solution of alkali metal sulfate increases the efficiency of chlorine dioxide generation such that the system will efficiently produce chlorine dioxide at normalities well beyond the 2 normal range. This phenomenon may be explained as a result of an ionic-strength mechanism, possibly occuring due to the presence of sodium sulfate with hydrogen ion causing an equilibrium between the sulfate and acid sulfate salts thereby permitting the system to perform efficiently at this higher acidity even with hydrochloric acid. However, applicant does not wish to be bound by any theory or mechanism of operation.

In any event, this increase in efficiency of hydrochloric acid systems at normalities of about 2 and above is surprising in view of previously known hydrochloric acid systems (British Patent 1,347,740), and presents a highly desirable reaction parameter permitting optimum operation of such hydrochloric acid systems at an acidity level equivalent to optimally operating sulfuric acid systems. The result is a continuous system which may utilize as acid feed either sulfuric, hydrochloric, or mixed acids, whichever is desired, without costly shutdowns for extensive changes in generator acidity and reactant composition. Thus, the commercial operator has at his control an efficient but versatile continuous chlorine dioxide generating system which allows easy and non-interruptive switching of acid feeds as the market and changing by-product requirements dictate.

The rate of chlorine dioxide generation in the process of this invention increases with the concentration of alkali metal chlorate present in the reaction solution. Therefore, the concentration of alkali metal chlorate is preferably maintained on the high side of the applicable concentration range of about 0.2 to about 5 molar. This is especially true during operation in the region from approximately 75 to 90 degrees centigrade and at pressures in the region of 400 millimeters mercury absolute, which conditions favor the solubility of large amounts of alkali metal chlorate.

As the temperature is reduced in coordination with the development of a vacuum over the reaction solution to withdraw water vapor, the concentration of chlorate is necessarily reduced to prevent crystallization of chlorate from solution which would negate any advantage derived from an increased reaction rate. Thus, when operating at the preferred pressure from about 100 to about 300 millimeters mercury absolute and temperatures between about 50 to 85 degrees centigrade, the concentration of alkali metal chlorate should be between about 0.2 to about 3 molar.

The reaction of the alkali metal chlorate with the strong acid may be conveniently performed in, but not limited to, a unilocular vessel (a single chamber reaction vessel) into which the reactants may be fed in separate streams and from which the gaseous mixture of chlorine dioxide, chlorine and water vapor is continuously removed by coordinating the reaction solution temperature with the pressure in the vessel so that water is evaporated from the reaction solution in an amount sufficient to maintain a substantially constant volume of reaction solution. The water removed from the reaction solution is an amount substantially equal to the amount of water introduced to the vessel in addition to the water produced in the reaction, and serves several functions. Among these are dilution of the chlorine dioxide gas to prevent development of explosive concentrations of gas, sweeping of the gases from the head-space above the reaction solution to assist in gas disengagement from the liquid medium, thereby avoiding the less desirable use of gaseous diluents with their attendant separation problems, and maintaining the saturation of alkali metal chloride and sulfate.

According to a preferred embodiment of the instant process, reactants comprising an aqueous solution of an alkali metal chlorate and a second solution comprising an aqueous strong acid solution are continuously fed to the reaction solution in a vessel and reacted in the presence of one or more catalysts, with the chloride ion being provided as either alkali metal chloride or hydrogen chloride. A vacuum is applied to the reaction vessel and coordinated with the temperature of the reaction solution to remove an amount of water from the reaction solution sufficient to maintain a substantially constant volume within the vessel. The vacuum may be applied by any known means, e.g. by a venturi eductor type vacuum device such as that produced by high pressure water, steam, or air, or with a vacuum pump. The products, chlorine dioxide and chlorine in admixture with water, are withdrawn from the reaction vessel and are further processed to separate the chlorine dioxide, water vapor, and chlorine.

As the reaction proceeds in the vessel, crystals of alkali metal salt appear from whence they are withdrawn as a slurry. The slurry may be removed by such well-known means as centrifuging, filtering, or other solid-liquid separation techniques.

Operation of the vessel under vacuum at a reaction solution temperature corresponding to the boiling point is not essential. Instead, the temperature of the reaction solution and the vacuum under which the vessel is maintained may be so coordinated as to be slightly below the boiling temperature of the reaction solution. Then, with the assistance of a stream of dry inert gas, such as nitrogen, or air, passing through the reaction solution, a suitable amount of water may be removed from the reaction solution as vapor to maintain a substantially constant volume of reaction solution. This latter method, however, has the disadvantage of causing the chlorine dioxide to be heavily diluted with inert gas. Therefore, it is preferred to so coordinate the vacuum and reaction solution temperature that the amount of water vapor necessarily removed from the vessel is flashed off without the necessity for the introduction of additional agents to remove water vapor.

The alkali metal chlorate, chloride and strong acid may be introduced into the reaction vessel as aqueous solutions containing any desired concentration to ultimately provide any desired ratio of the two reactants in the reaction solution. The concentration of alkali metal chlorate and strong acid influences the ratio of chlorine dioxide to chlorine evolved, as well as the solubility of the alkali metal sulfate and alkali metal chloride.

Through the use of at least one catalyst selected from the group consisting of vanadium pentoxide, silver ions, manganese ions, dichromate ions, palladium ions and arsenic ions, in conjunction with the strong acid to convert an alkali metal chlorate to chlorine dioxide, it has been found that the chlorine dioxide efficiency and the reaction rate increases at reaction solution average acidities from about 2 to about 11 normal. Due to the continuous evaporation of water from the reaction solution, a saturated solution with respect to the alkali metal sulfate and chloride is maintained, thereby causing selective crystallization in the reaction solution within the vessel of the salt formed by the reaction. The alkali metal salt is withdrawn from the vessel periodically or continuously, and the chlorine dioxide and chlorine evolved together with water vapor are continuously withdrawn from the vessel.

In operation, the concentration of alkali metal chlorate in the aqueous reaction solution depends upon the acid normality range being used and generally will vary within the range of 0.2 to 5 moles per liter, preferably within the range of 0.2 to 3 moles per liter. By continuous addition of alkali metal chlorate to the reaction solution during the process operation, the desired concentration can be maintained and coordinated with the concentration of strong acid to provide the optimum chlorine dioxide generating conditions. The strong acid may be continuously introduced into the reaction solution to afford an average acidity level between about 2 to about 11 normal, or most preferably, within the range of between about 2 to about 5 normal. The addition of the reagents, alkali metal chlorate and strong acid, as well as any additional make-up catalyst is coordinated with the removal of water from the reaction solution, to provide a desired continuous state concentration of reagents and catalysts. The rate of heat input and the reduced pressure is also coordinated to provide for the removal of water equivalent to that being added to the system and being formed by the reaction taking place within the reaction solution.

The process described herein utilizes in the reactor a saturated solution of alkali metal chloride and alkali metal sulfate. When the strong acid selected is sulfuric acid, additional alkali metal sulfate crystals will be formed in the reactor, and likewise if hydrochloric acid is used as the strong acid, additional alkali metal chloride crystals would be formed. The crystals produced in the reactor may be removed from time to time and would be removed in a slurry form.

The slurry which will be predominately the alkali metal salt of the strong acid being used in the reactor will also contain a minor amount of the other alkali metal salt which saturates the reaction solution.

When hydrochloric acid is used as the strong acid, the process slurry may be introduced into the top of a separating column as disclosed in U.S. Pat. No. 4,045,542, to obtain substantially pure alkali metal chloride salt crystals on the bottom of the column while continuously returning the washing liquid containing chloride, chlorate and acid values to the generator.

Where the generator is utilizing sulfuric acid, or mixtures thereof with hydrochloric acid, the process slurry may be introduced to the top of a separating or metathesis column as described in U.S. Pat. No. 3,976,758; U.S. Pat. No. 4,049,785, and copending application Ser. No. 836,103, filed May 24, 1976, to obtain separation and purification of the resultant salt, or to produce other desirable products by metathesis with or without the return of usable values to the generator. The process permits the return to the reaction vessel of any liquid removed from the vessel with solid alkali metal salt as a slurry. If substantially all of this liquid removed from the vessel is not returned, the rate at which the water is evaporated from the reaction solution will be adjusted relative to the amount returned to the system.

It should be understood that alkali metal chlorates other than sodium chlorate may be employed. Thus, potassium, lithium and calcium chlorate may be used. Mixtures of these salts may be employed if desired.

It should also be understood that the sulfuric acid employed in this invention may be derived from a variety of sources, such as the "spent acid" normally discharged as effluent liquor from conventional chlorine dioxide generating processes, and more fully described in U.S. Pat. No. 3,446,584, the pertinent disclosure of which is incorporated herein by reference.

The preferred process is conducted in the presence of a catalyst selected from the group consisting of silver ions, manganese ions, dichromate ions, arsenic ions, palladium ions, vanadium pentoxide, and mixtures thereof.

The silver ion is a preferred catalyst. From about 0.0001 to about 1.5 grams of silver ion per liter of reaction solution should be used. Although more than about 1.5 grams of silver ion may be used, one does not obtain significant increased efficiency with the excess amount of said ion.

Manganese ion is also one of the preferred catalysts. From about 0.001 to about 4 grams of the manganese ion per liter of reaction solution should be used. Again, although one may use more than 4 grams of manganous ion per liter of reaction solution, one does not obtain any significant increased efficiency in chlorine dioxide generation due to the use of the excess amount of said ion.

The dichromate ion, especially in the form of an alkali metal dichromate, such as sodium and potassium dichromate, is the most preferred catalyst. It should be used at concentrations of from about 0.5 to about 25 grams per liter, it again being understood that one can use more than 25 grams per liter if so desired.

The arsenic ion, vanadium pentoxide and palladium ions are also useful catalysts.

EXAMPLE 1

The reaction was effected by establishing a generator-evaporator-crystallizer unit charged with an aqueous solution of sodium chlorate, sodium chloride and sodium sulfate. An aqueous solution of silver nitrate was added to provide silver ion as a catalyst. This solution was saturated with sodium chloride. Sulfuric acid was introduced into the generator and chlorine dioxide and chloride were generated until the solution became saturated with sodium sulfate. During operation, after sulfate saturation, the gram atom efficiency of chlorine dioxide produced ranged from 47.6% to 49.6%. The generator composition during this period varied within the following ranges:

$H_2SO_4$: 2.7–3.1 N
$NaClO_3$: 1.43–1.5 M

The temperature ranged from 61.5° to 64° C. and the pressure was maintained at 164–170 mm mercury absolute and chlorine dioxide chlorine and water vapor were removed and the rates of production and amounts of chlorine dioxide and chlorine were determined. The rate of production of chlorine dioxide varied from 0.9 to 1.6 gram/minute and the chlorine was produced at the rate of 0.5 to 0.87 gram/minute.

During operation the acid feed was switched to hydrochloric acid, the gram atom efficiency of chlorine dioxide ranged from 42.9 to 46.4%. The generator composition during the HCl operation varied within the following ranges:

HCl: 2.69–3.19 N
$NaClO_3$: 1.47–1.63 M

The temperature ranged from 62°–63.5° C. and the pressure was maintained at 164–168 mm mercury absolute, and chlorine dioxide, chlorine and water vapor were removed and the rate of production of chlorine dioxide and chlorine were determined. The rate of production of chlorine dioxide varied from 1.64 to 1.91 grams/minute and the chlorine was produced at the rate of 0.85 to 1.6 grams/minute.

Operation under each type of acid feed continued for a period of greater than 6 hours.

It is appreciated that the instant specification and description are set forth by way of illustration and not limitation, and that various modifications and changes may be made without departing from the spirit and scope of the present invention.

What is claimed is:

1. A process for the production of chlorine dioxide and chlorine permitting the use of either hydrochloric acid or sulfuric acid interchangeably as strong mineral acids in the same reactor under substantially the same reaction conditions, said process comprising the steps of:
   (a) feeding sulfuric acid into a reactor containing an aqueous reaction solution comprising an alkali metal chlorate, an alkali metal chloride, and an alkali metal sulfate, the acid normality of said reaction solution being in the range of from about 2 to about 11, said reaction solution being continuously saturated with the alkali metal chloride and alkali metal sulfate,
   (b) continuing to feed sulfuric acid into the reactor to generate chlorine, chlorine dioxide, and an alkali metal salt product,
   (c) changing the acid feed from sulfuric acid to hydrochloric acid, and
   (d) continuing to feed hydrochloric acid into the reactor without substantial modification of reaction conditions to generate chlorine, chlorine dioxide, and an alkali metal salt product.

2. The process of claim 1 wherein the reaction solution includes a catalytic amount of at least one catalyst selected from the group consisting of vanadium pentoxide, silver ions, manganese ions, dichromate ions, palladium ions, and arsenic ions.

3. The process of claim 1 wherein the alkali metal chloride is sodium chloride and the alkali metal sulfate is sodium sulfate.

4. The process of claim 1 wherein the alkali metal salt by-product comprises primarily sodium chloride.

5. The process of claim 1 wherein the alkali metal salt by-product comprises primarily sodium sulfate.

6. The process of claim 1 wherein the reaction is conducted in a single vessel generator-evaporator-crystallizer.

7. The process of claim 6 wherein the alkali metal salt by-product is purified by passing through an elutriation, metathesis or a combined elutriation-metathesis column.

8. The process of claim 1 wherein the sulfuric acid reactant is obtained from the effluent liquor of another chlorine dioxide generating process.

9. The process of claim 1 wherein the reaction temperature is maintained at between about 25° C. to about 90° C. and the pressure is maintained at between about 20 to about 400 millimeters of mercury absolute.

10. The process of claim 1 wherein the concentration of alkali metal chlorate in the reaction solution is from about 0.2 to about 5 molar.

* * * * *